(12) United States Patent
Weber, Jr.

(10) Patent No.: US 7,366,773 B2
(45) Date of Patent: Apr. 29, 2008

(54) ALTERNATIVE COMMUNICATIONS PATHS FOR DATA SENT OVER POWER LINE CARRIER

(75) Inventor: John Robert Weber, Jr., Northport, NY (US)

(73) Assignee: DGI Creations, LLC, Raleigh, NC (US)

( * ) Notice: Subject to any disclaimer, the term of this patent is extended or adjusted under 35 U.S.C. 154(b) by 313 days.

(21) Appl. No.: 11/344,402

(22) Filed: Jan. 30, 2006

(65) Prior Publication Data

US 2007/0180017 A1 Aug. 2, 2007

(51) Int. Cl.
*G06F 15/173* (2006.01)

(52) U.S. Cl. ............... 709/223; 709/220; 709/237; 709/239; 370/77; 370/464; 370/389; 375/9; 375/75; 375/316; 340/5.53; 340/310.11; 340/538.11

(58) Field of Classification Search ........... 709/223, 709/224, 237, 239
See application file for complete search history.

(56) References Cited

U.S. PATENT DOCUMENTS

| | | | |
|---|---|---|---|
| 4,535,447 A | 8/1985 | Rosanes et al. | 370/77 |
| 4,642,607 A | 2/1987 | Strom et al. | 340/310 |
| 4,668,934 A * | 5/1987 | Shuey | 370/464 |
| 4,737,967 A | 4/1988 | Cahalan | 375/9 |
| 4,804,938 A | 2/1989 | Rouse et al. | 340/310 |
| 5,317,598 A * | 5/1994 | Cahalan et al. | 375/316 |
| 5,349,644 A | 9/1994 | Massey et al. | 395/200 |
| 5,822,165 A * | 10/1998 | Moran | 361/78 |
| 6,388,564 B1 * | 5/2002 | Piercy et al. | 340/310.11 |
| 6,980,091 B2 * | 12/2005 | White et al. | 340/5.53 |
| 6,998,962 B2 | 2/2006 | Cope et al. | 340/310.01 |
| 7,170,405 B2 * | 1/2007 | Daum et al. | 340/538.11 |
| 2002/0026532 A1 * | 2/2002 | Maeda et al. | 709/250 |
| 2003/0046377 A1 * | 3/2003 | Daum et al. | 709/223 |

(Continued)

FOREIGN PATENT DOCUMENTS

WO    WO 99/09488    2/1999

(Continued)

OTHER PUBLICATIONS

"IEEE Tutorial on Automated Fault Analysis" (Jul. 2001), source: Google Scholar. http://class.ece.iastate.edu/ee653/Week7/IEEE%20Tutorial%20Automated%20Fault%20Analysis.pdf.

*Primary Examiner*—Michael Won
(74) *Attorney, Agent, or Firm*—The Eclipse Group LLP; Kevin E. Flynn (57) ABSTRACT

Extensions to the concept of using a power line carrier to convey a data record from the secondary side of a first transformer to a receiver in a power distribution substation include receiving the data record over a secondary data path in the event that the primary path is not available. The data record received over the secondary path through a second transformer rather than the first transformer must not interfere with other data transmissions from other transmitters and needs to identify the source of the transmission. An alternative to using a secondary data path through second transformer rather than the first transformer is to provide a data bridge around an opening in the primary path. This abstract is drafted to aid those searching for relevant patents and does not represent a legal limit on the scope of claims arising from patents claiming priority to this application.

14 Claims, 8 Drawing Sheets

U.S. PATENT DOCUMENTS

| | | |
|---|---|---|
| 2003/0095036 A1 | 5/2003 | Wasaki et al. ......... 340/310.01 |
| 2003/0158677 A1 | 8/2003 | Swarztrauber et al. ........ 702/62 |
| 2004/0113756 A1 | 6/2004 | Mollenkopf ........... 340/310.01 |
| 2004/0183522 A1 | 9/2004 | Gunn et al. .................. 324/126 |
| 2005/0083925 A1 | 4/2005 | Bonicatto et al. ........... 370/389 |
| 2005/0132241 A1 | 6/2005 | Curt et al. ................... 713/300 |
| 2006/0077047 A1 | 4/2006 | Zalitzky et al. ........ 340/310.11 |
| 2007/0086133 A1* | 4/2007 | Loucks et al. ................ 361/84 |

FOREIGN PATENT DOCUMENTS

| | | |
|---|---|---|
| WO | WO 02/056039 A1 | 7/2002 |
| WO | WO 03/005599 A1 | 1/2003 |

* cited by examiner

ALTERNATIVE COMMUNICATIONS PATHS FOR DATA SENT OVER POWER LINE CARRIER

BACKGROUND OF THE INVENTION

Field of the Invention

This invention relates generally to the field of data communications over power lines. This form of communication, called power line carrier (PLC), introduces a high frequency analog signal onto a power cable used to convey power in a portion of an electric distribution network. The analog signal is received at a distant receiver through the use of a pick up coil or other means of decoupling an analog signal from a power line.

Power line carrier is used by some information collection systems to send measurements and other information about the operation of a transformer, related equipment, and conditions in the vicinity of the transformer such as in a vault. The information is sent in a data record over one of the three phases of the feeder bus to a centralized location such as a switchyard where the information is pulled from the phase of the feeder bus by a coil or other means and provided to a receiver which also receives information about the operation of other distribution transformers.

Figure 1:
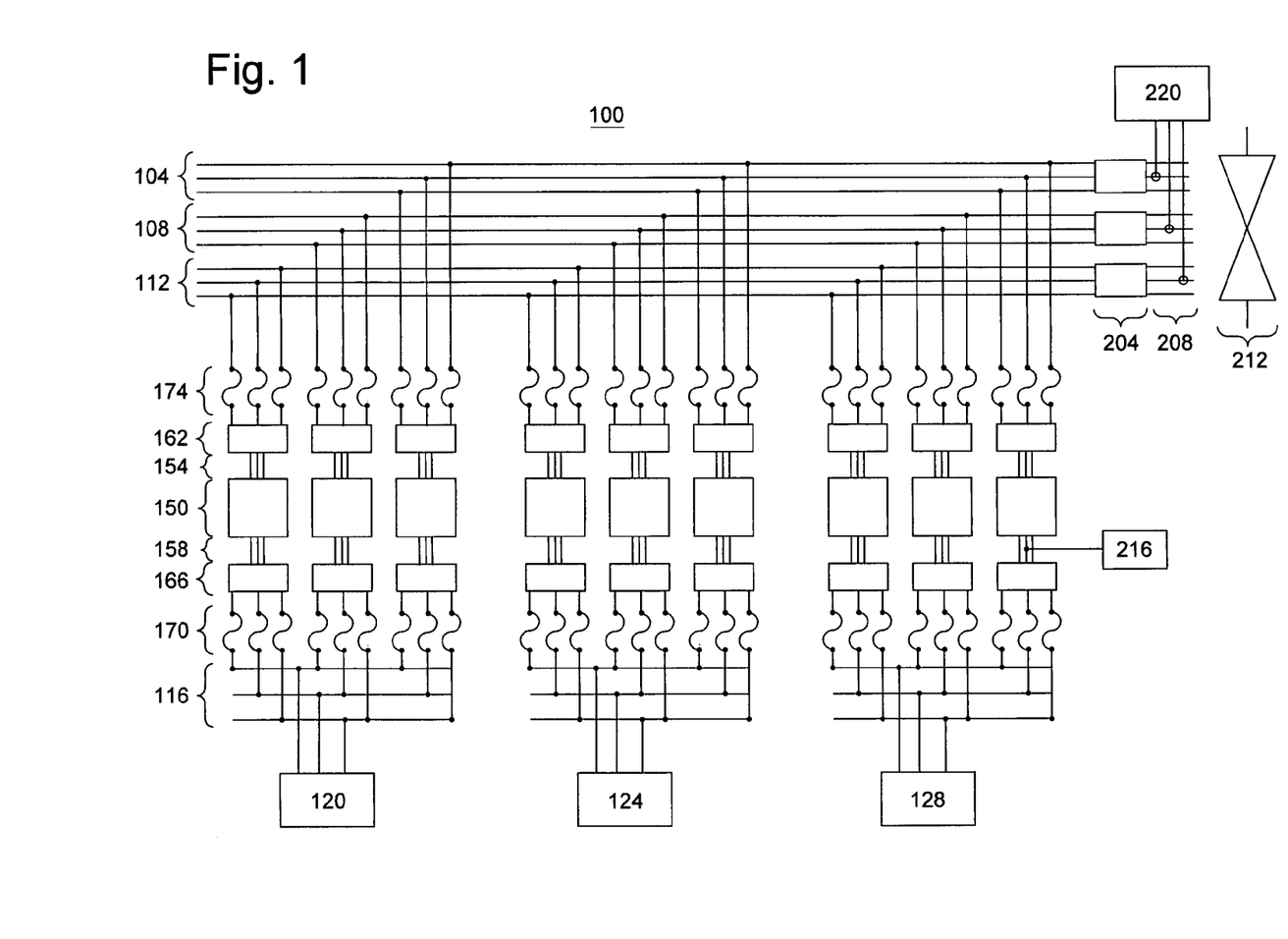
FIG. 1 depicts a portion of an electrical distribution network in order to explain the environment and context of the present invention.

FIG. 1 introduces the environment relevant to the present invention. A portion of an electrical distribution network is shown as network 100. Network 100 has feeder bus 104, feeder bus 108, and feeder bus 112. A representative voltage for operation of these feeder buses may be 13 Kv but other systems may operate at 27 Kv, 34 Kv or some other voltage. The power on these three buses is provided to a set of local distribution networks 116 to server loads 120, 124, and 128. The voltage on these local distribution networks is apt to be 120 volts, but it could be 277 volts, 341 volts or some other voltage. In some cases these loads represent a building or even a portion of a very large building. Depending on the amount of load, the local distribution network may be coupled to one, two, or three feeder buses (104, 108, 112). Even when the load can consistently be serviced by just one feeder bus, a desire for reliability leads to providing a redundant path for providing service in case of equipment failure, scheduled maintenance, load balancing, or other needs.

The local distribution networks 116 are coupled to the feeder buses 104, 108, and 112 through transformers 150 and related equipment. The transformers convert the relatively higher voltage on the primary side 154 of the transformers 150 to the low voltage on the secondary side 158 of the transformers 150.

The transformers 150 have breakers 162 on the primary side to isolate the transformers 150 from the feeder buses. The transformers 150 have network protectors 166 on the secondary side 158 of the transformers 150 to isolate the transformers 150 from the local distribution networks 116 as needed to protect the transformers from current flowing from the distribution networks to the primary side 154 of the transformers (known as back feed).

Additionally, some networks include sets of fuse links 170 between the network protectors 166 and the local distribution networks 116. Some networks including sets of primary fuse links 174 between the breakers 162 and the feeder buses 104, 108, and 112.

The feeder buses 104, 108, and 112 are can be isolated by a set of substation breakers 204 from the transmission network 208 which is ultimately connected to a set of power sources represented here by turbine 212.

FIG. 1 shows a small portion of the network which may have more feeder buses and many more local distribution networks 116 providing power to many more loads. These loads may be distributed around a portion of a city. The various transformers 150 may be in pits (vaults) near the various loads. Thus it is convenient to inject analog signals onto the power lines so that the analog signals can be picked off by coils at the substation and fed to a receiver 220. The precise way that the analog signals are removed from the power line is not relevant to the scope of the present invention, but one typical means for acquiring the analog carrier signal is through a Rogowski air coil as is known in the art. These analog signals are often in the frequency range of 40 KHz to 70 KHz which is much higher than the frequency of the power being distributed over the network. (For example one common frequency for power grids is 60 Hertz although other frequencies are used throughout the world and can be used in connection with the present invention).

Co-pending and commonly assigned U.S. patent application Ser. No. 11/113,843 for Signal Decoding Method and Apparatus describes one system to decode information sent by phase shift keying over one of several possible carrier frequencies. For purposes of this application, it is not necessary to focus on having more than one carrier frequency as the present invention can be implemented in a system using one carrier frequency. While Phase Shift Keying is a known method for increasing the information density in a data transmission, the details of Phase Shift Keying are not relevant to an understanding of the present invention.

A preferred location for injecting the analog signal containing information about the operation of a transformer and related equipment is on the secondary side 158 of the transformer between the transformer 150 and the network protector 166. Transmitter 216 is shown in FIG. 1 to illustrate this location. Placement of transmitter 216 in this location allows for the injection of the analog signal onto the relatively low voltage, secondary side of the transformer 150. Traversing the transformer from secondary side to primary side provides only a slight attenuation of the high frequency carrier signal. As the path for the data on the power line carrier signal is from transmitter 216 on the secondary side 158 of the transformer 150 to the primary side 154, then through the breaker 162, primary fuse 174, feeder bus 104, substation breaker 204, pick-up coil (not shown) and ultimately to receiver 220, the data path is not impacted by opening of the network protector relay 166 or fuses 170. However, if either the breaker 162 or the primary fuse 174 for the phase carrying the power line carrier signal opens, then the data about the operation of the transformer and related information cannot get back to the receiver 220 on the normal path.

It would be a useful improvement to the prior art to have the capacity for a power line carrier signal to have a secondary communication path from the transmitter near the transformer 150 to the receiver 220 that would be used events such as breaker 162 being open or primary fuses 174 being open.

It would be a useful improvement to the prior art to have the capacity to bridge data around an open device that so that the open device does not block or inhibit a communication path to the receiver.

It would be a useful improvement to the prior art to provide alternative data paths to enhance the likelihood that a data record could reach the receiver even in the event that one or more barriers exist for the data record to reach the receiver.

BRIEF SUMMARY OF THE INVENTION

The present invention is directed to a number of ways to increase the likelihood that at least one communication path is available for the transmission of a data record between a transmitter and a receiver over a portion of an electrical distribution network.

DETAILED DESCRIPTION

The present invention will now be described more fully hereinafter with reference to the accompanying drawings, in which embodiments of the invention are shown for the sole purpose of conveying the concepts of this invention to those of skill in the art. The actual scope of the invention is not limited by the precise embodiments used to teach the concepts but by the scope of the claims granted in connection with this application.

In one embodiment of the present invention, a data record is placed onto a carrier signal by a transmitter and subsequently removed from the power line and processed by a receiver. For a data record that is conveyed, perhaps by phase shift keying, perhaps over a period of 390 milliseconds, each transmitter is allotted a time slot for transmission. For example transmitter one is provided with a time slot of 390 milliseconds starting 60 seconds after a synchronizing event (such as the initial provision of power to the transmitter), transmitter two gets a time slot at 60.4 seconds which is 400 milliseconds after transmitter 1 begins sending a data record in its time slot and shortly after the cessation of transmission of the 390 millisecond data signal. Transmitter 3 is given a time slot at 60.8 seconds after the synchronizing event and every 60 seconds thereafter. Thus, a single input to the receiver coming from a single coil connected to a single phase of one feeder bus could process data transmissions from one hundred and fifty transmitters operating on a single power line carrier frequency and receive a data record from each transmitter once a minute. Additional transmitters could be supported if the gap between successive transmissions for each transmitter was increased from one minute to a longer period. For each additional power line carrier frequency used, another one hundred and fifty transmitters could be processed once a minute (assuming that the difference on carrier frequency does not appreciably alter the 390 millisecond length of time needed to transmit the data record).

Additional transmitters could be serviced by a receiver if those transmitters were connected to a different phase of the three phase power and additional pick-up coils were added to connect the receiver to the data sent over that additional phase.

Those of skill in the art will be familiar with mechanisms to recognize that more than one transmitter is transmitting on a given frequency at a given time such that the transmitters must be resynchronized or are allocated different time slots or instructed to transmit on different frequencies in order to avoid conflict.

As the data record transmitted by the transmitter includes a unique identifier for that transmitter (such as an assigned transmitter ID number), the receiver uses the material in the data record to identify the transmitter rather than looking at some combination of the frequency, feeder bus, and time slot. Thus, it does not matter how the data record gets to the receiver as long as the data record gets to the receiver.

Figure 2:
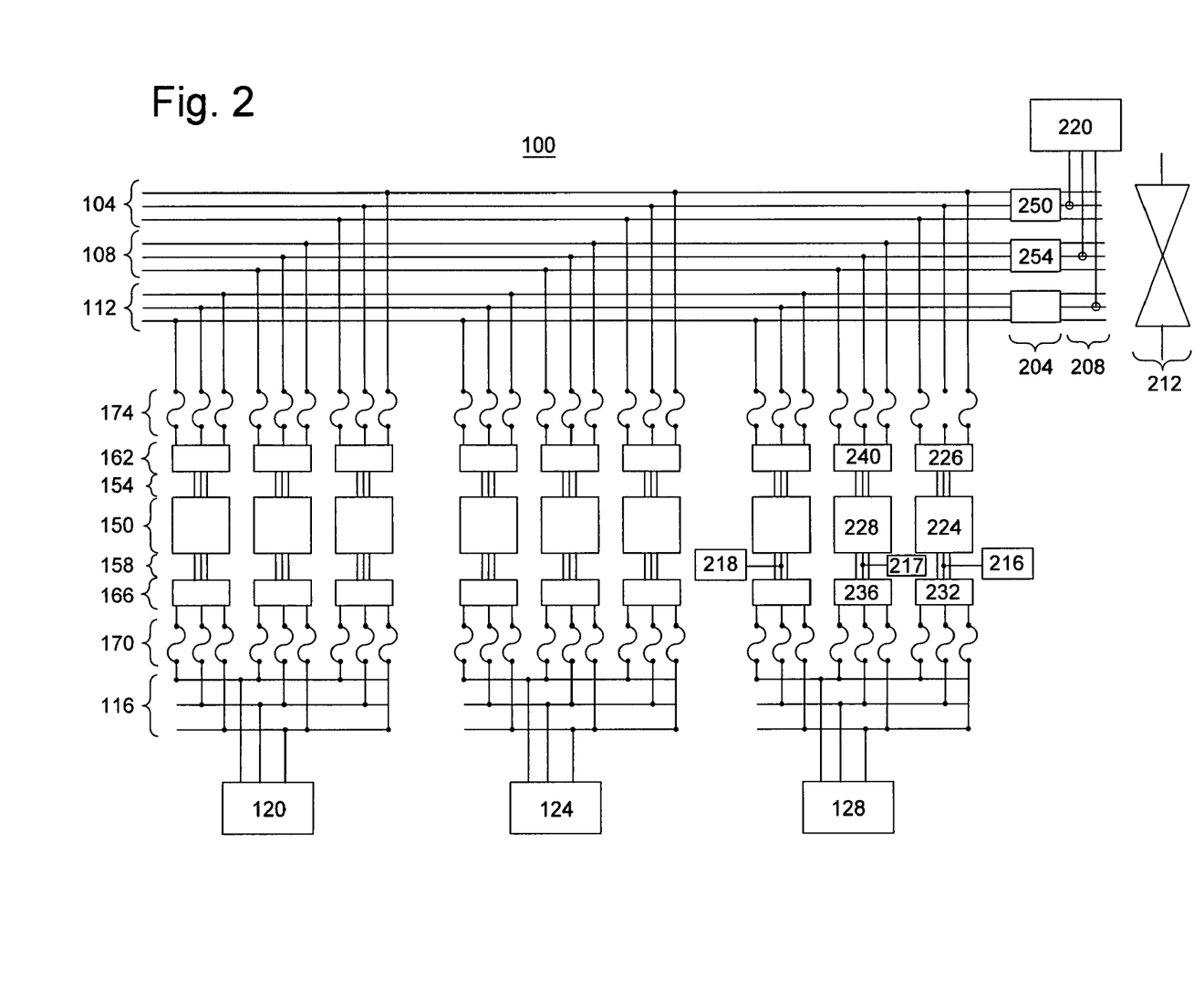
FIG. 2 shows the electrical distribution network with an open fuse that blocks the primary data path between transmitter 216 and receiver 220.

Turning to FIG. 2, a primary fuse 174 on the B phase between feeder bus 104 and the primary of transformer 224 is open. Thus the primary path for communication between transmitter 216 and receiver 220 is interrupted. A secondary path exists between transmitter 216 and receiver 220 through network protector 232 past intact fuses 170 onto local distribution network 116 through another set of fuses 170 and network protector 236 and transformer 228, breaker 240, intact fuses 174, onto feeder bus 108 and to receiver 220. Receiver 220 processes the data record and notes the transmitter ID belongs to the transmitter associated with transformer 224 despite the fact that transformer 224 is attached to feeder bus 104 and this data record was pulled from feeder bus 108. As the time slots allocated for transmitter 216 is different from the time slot allocated to transmitter 217, it is not necessary that transmitter 216 use a different carrier frequency than transmitter 217, even if the data records are transmitted along the same path. Note that this secondary path for communicating information about transformer 224 travels to receiver 220 over feeder bus 108 rather than feeder bus 104 so that information about the status of the transformer 224 and related equipment can be provided to receiver 220 while substation breaker 250 is open as the data record is passed through closed substation breaker 254. Thus conditions at transformer 224 and in related equipment can be assessed before the transformer is put into service.

An additional secondary path between transmitter 216 and receiver 220 exists through intact fuses 170, network protector 250, transformer 254, breaker 258, primary fuses 174, and feeder bus 112. The existence of more than one secondary communication path between transmitter 216 and receiver 220 is not a problem.

If both the primary and the secondary communication paths are open, or if the primary communication path is not open but more than one secondary communication path is open, or if the primary communication path is open and more than one secondary communication path is open, the receiver 220 will receive the same data record during the same time slot via two or more different feeder buses (104, 108, 112). The receiver will simply write the data record into memory reserved for that transmitter (as the source transmitter is knowable based on the contents of the data record). As one data record may be received and processed slightly slower than the another copy of that same data record, the later processed data record will either be discarded as redundant or simply overwrite the earlier processed identical data record. A data record would be identifiable as redundant if the data record included a transmission time stamp. Whether duplicate data records are deleted or used to replace identical data records, there is no harm to the receipt of two data records containing the same information.

Note that with the present location of the transmitter 216, the opening of breaker 226 or one of the fuses 174 in combination with the opening of network protector 232 and the fuse set 170 on the B phase would make transmitter 216 isolated as a data record could not travel on the primary or any secondary communication path.

Figure 3:
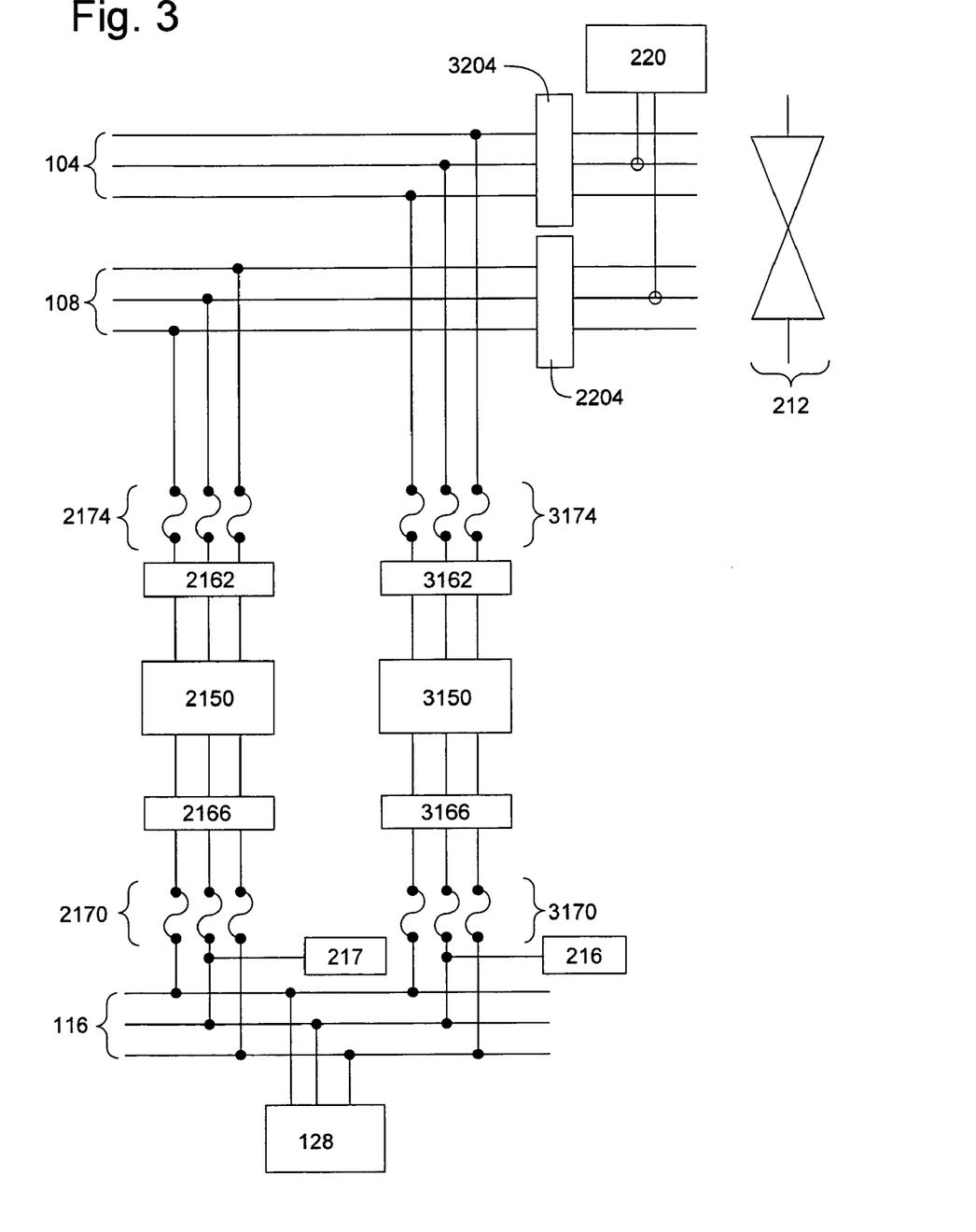
FIG. 3 shows a smaller portion of the network with transmitters on the load distribution network side of the secondary side fuses.

FIG. 3 shows a smaller portion of a network. In FIG. 3, transformer 2150 can provide power from feeder bus 108 to load 128 through local distribution network 116 and transformer 3150 can provide power from feeder bus 104 to load 128 through local distribution network 116. FIG. 3 differs from FIG. 2 in that the transmitters 216 and 217 have been moved. Transmitter 216 is now beyond fuse set 3170. Transmitter 217 is now beyond fuse set 2170. With the placement of transmitter 216 as shown in FIG. 3, transmitter 216 can provide a data record to local distribution network 116 even if network protector 3166 opens. The data record from transmitter 216 can convey information about transformer 3150 and associated equipment to receiver 220.

As the transmitters 216 and 217 are used to convey more and more information about the transformer and related equipment, it becomes more and more important that a data path be maintained in order to provide information that may help remote operations people in discerning whether equipment, such as a network protector opened properly to avoid back feeding the transformer or opened without sufficient justification. As the information in the data record is used to provide more and more information, it may become appropriate to provide a bridge around components that are apt to block the primary data communication path.

Figure 4:
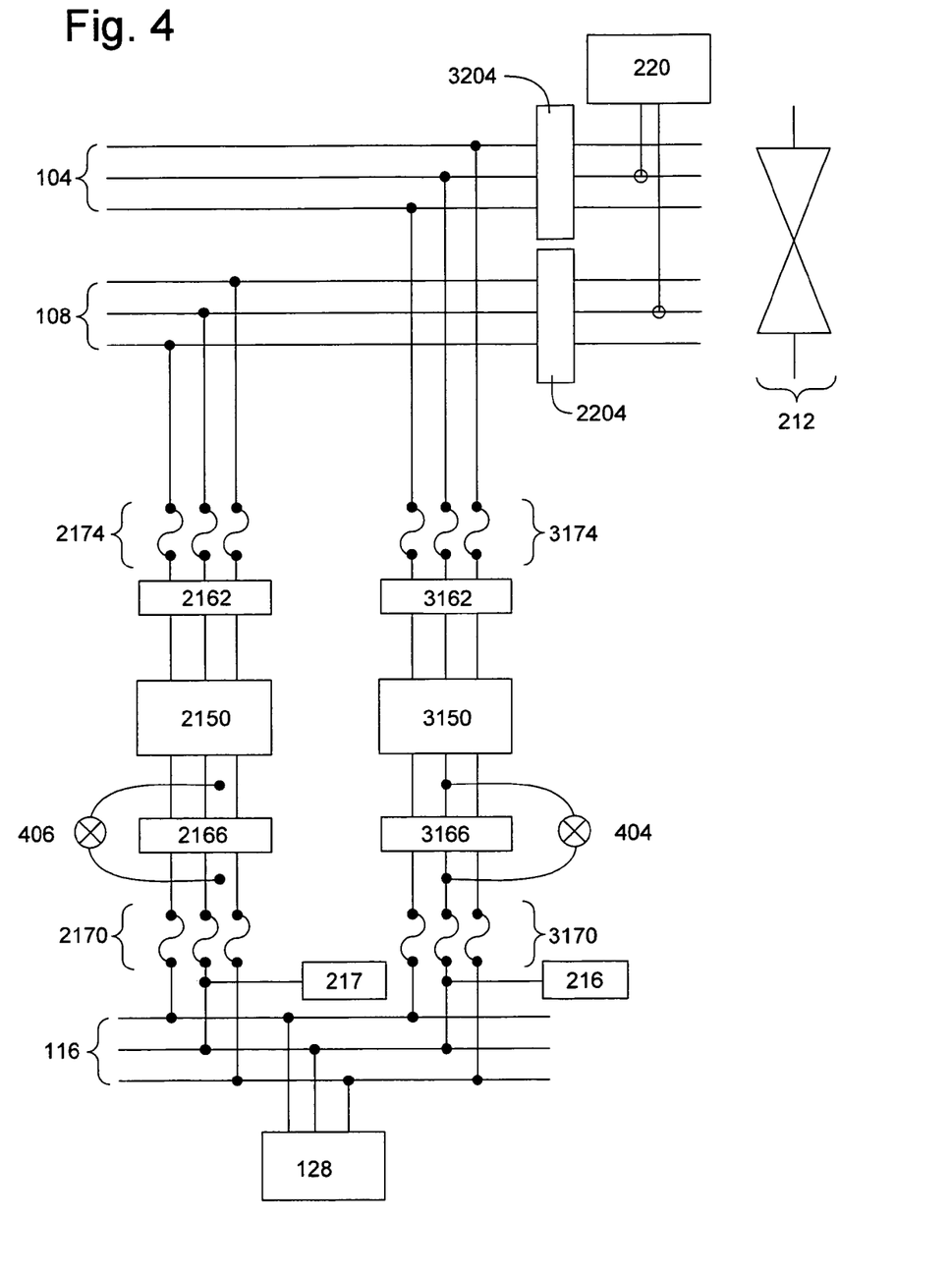
FIG. 4 illustrates the use of data bridges around network protectors.

FIG. 4 illustrates this concept. FIG. 4 introduces a data bridge 404 providing a low impedance pathway for high frequency signals such as the carrier frequencies and a high impedance pathway to block the low frequency signals such as the 50 or 60 Hertz current used in many power distribution systems. A data bridge of this type could be composed of a high pass filter or a band pass filter to allow the carrier frequencies to have a low impedance pathway. An example of when such a data bridge would be useful is when all feeds to a spot node have an interruption of some type and at least one of the interruptions is exclusively in the network protector. If load 128 includes some end user facilities with faulty cogeneration equipment, it is possible that the cogeneration equipment could back feed the local distribution network 116 such that network protector 3166 opens. If breaker 2162 and network protector 2166 were already open, there would not any viable path from transmitters 216 and 217 to the receiver 220 unless the data records passed over data bridge 404 around the open network protector 3166. These data records would convey the voltage level of the local distribution network 116 which would cause the operators to consider faulty cogeneration equipment rather than a faulty network protector 3166 as the cause of the open network protector.

Figure 5:
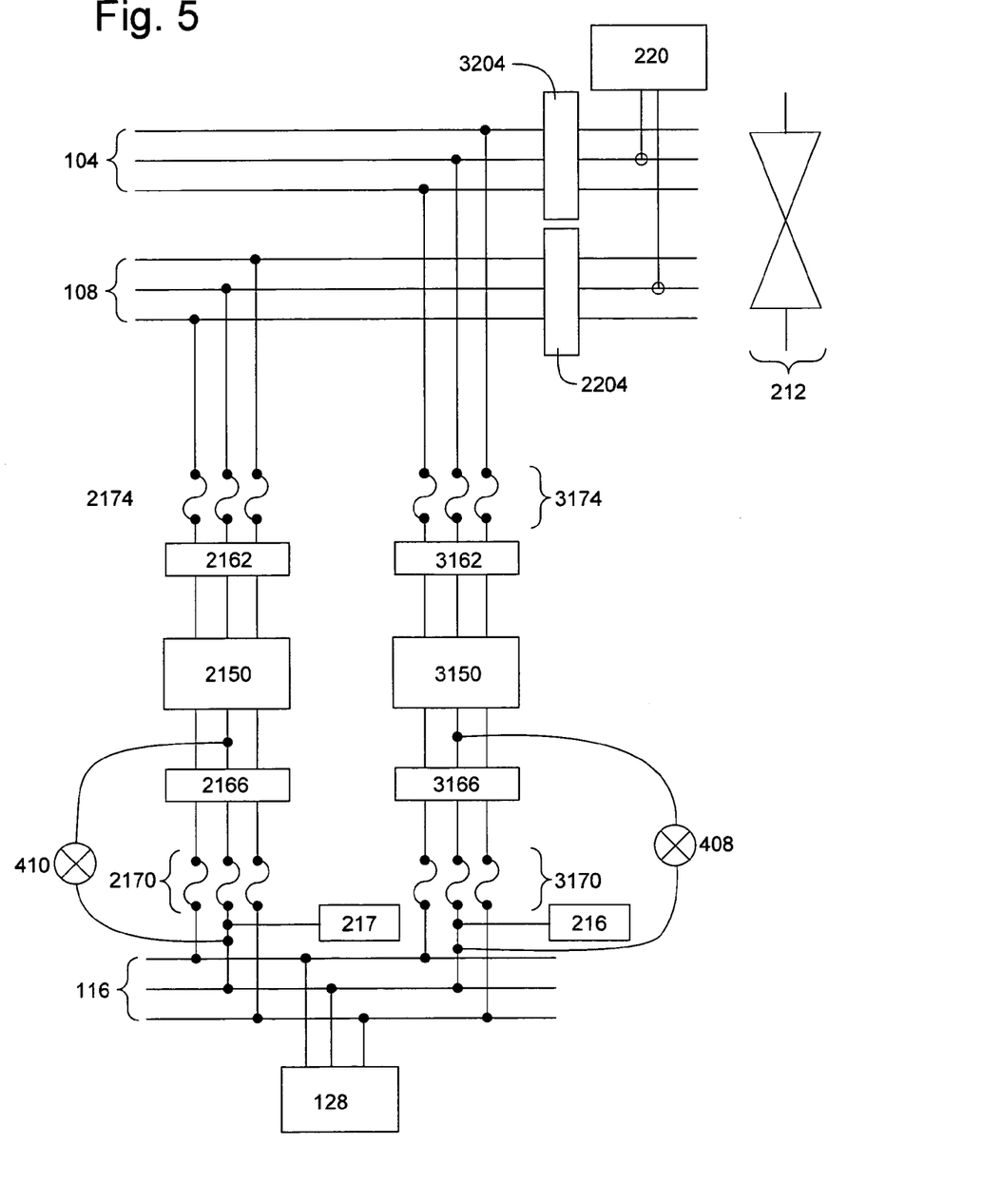
FIG. 5 illustrates the use of data bridges around both the network protectors and the relevant secondary side fuses.

FIG. 5 shows a variation of the data bridge concept shown in FIG. 4. In FIG. 5, the data bridges 408 and 410 extend around fuse sets 3170 and 2170 in addition to network protectors 3166 and 2166.

An advantage of a data bridge as shown in FIGS. 4 and 5 over the exclusive reliance on a secondary communication path over the local distribution network 116 is that the best path for the data record from the transmitter 216 to the receiver 229 is through its network transformer 3150 and through the original feeder bus 104.

The secondary communication path from transmitter 216 to receiver 220 over local distribution network 116 and transformer 2150 is not the desired path back to the substation. The secondary communication path has a great deal more signal attenuation. This extra attenuation arises in part from uncontrolled impendence mismatches on the network. The various figures shown to illustrate the present invention do not convey the extended distances that may exist between transformers that feed the same local distribution networks (such as 116). The distance between the secondary side of transformer 3150 and the secondary side of transformer 2150 is often 600 to 1000 feet apart.

Thus, when feeder bus 104 is in service (substation breaker 3204 is closed) but network protector 3166 is open, the data path from transmitter 216 to receiver 220 through the data bridge (404 or 408) has much less attenuation of the data signal than the secondary communication path through transformer 2150.

Figure 6:
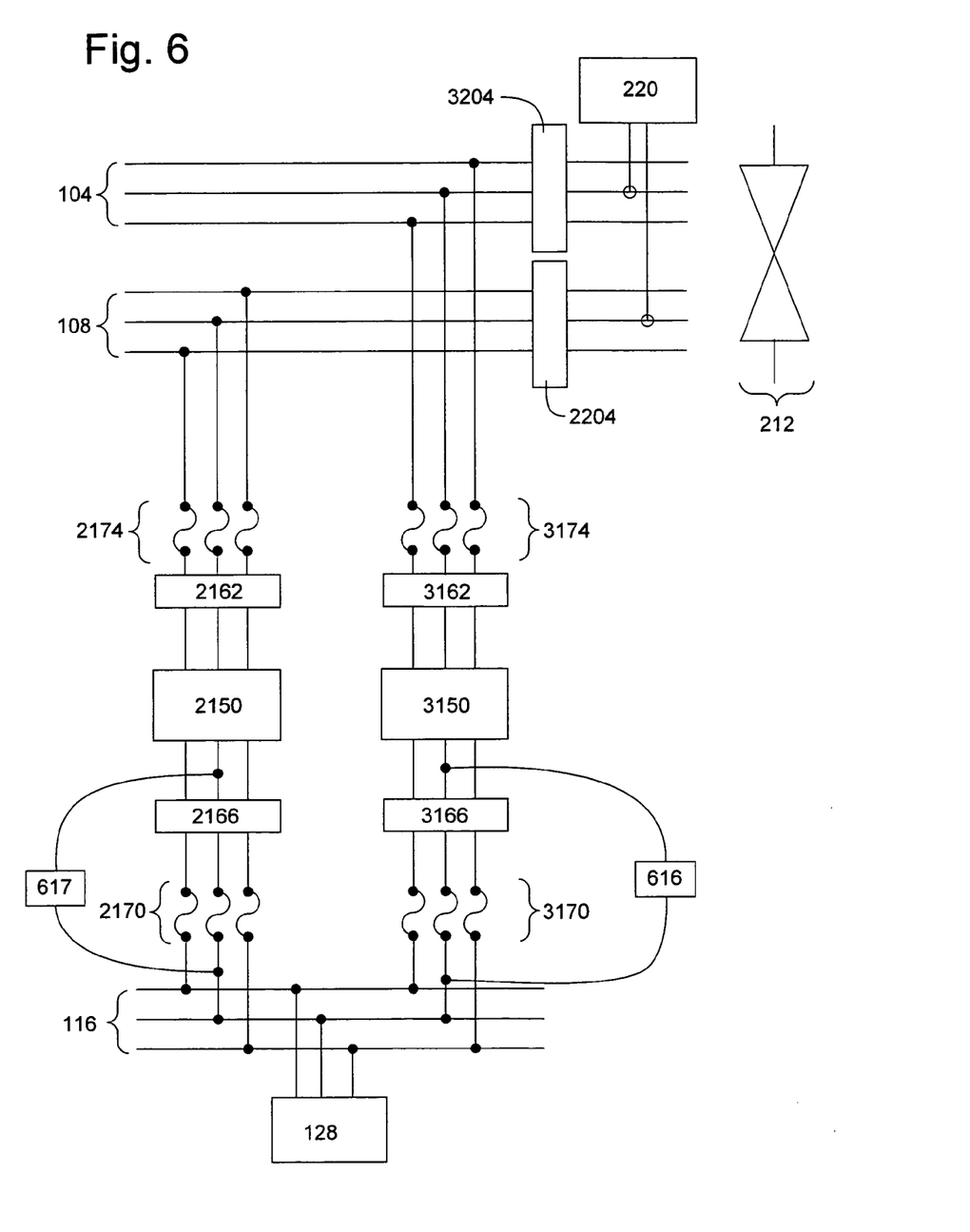
FIG. 6 illustrates the use of transmitters with the capacity to inject data records onto both sides of a network protector so that an open network protector is not a barrier to data movement to the receiver.

FIG. 6 provides another solution that provides two communication paths such that the opening of the network protector 2166 or 3166 or the fuses 2170 or 3170 cannot isolate the transmitters 616 and 617 from receiver 220. The solution illustrated in FIG. 6 calls for the dual injection of the data record from each transmitter to both a position between the secondary of the transformer (2150 and 3150) and the network protector (2166 and 3166) and between the fuses (2170 and 3170) and the local distribution network 116. As discussed above, if both the primary and the secondary communication paths are open, the receiver 220 will receive the same data record during the same time slot via two different feeder buses (104 and 108). One of skill in the art can appreciate that when network protector 3166 is closed and fuse set 3170 is intact, there is no advantage to the dual injection of the data record. The receiver will simply write the data record into memory reserved for that transmitter (as the source transmitter is knowable based on the contents of the data record). As one data record may be received and processed slightly slower than the other copy of that same data record, the later processed data record will either be discarded as redundant or simply overwrite the identical data record. In either event, there is no harm to the receipt of two data records containing the same information.

The dual injection concept in FIG. 6 could be applied to inject the data record on either side of the network protector 2166 or 3166 without also providing a route around fuses 2170 and 3170 as those fuse sets may not exist in particular system, may be remote from the network protectors, or may not be viewed as a frequent source of interruption of the secondary communication pathways.

Figure 7:
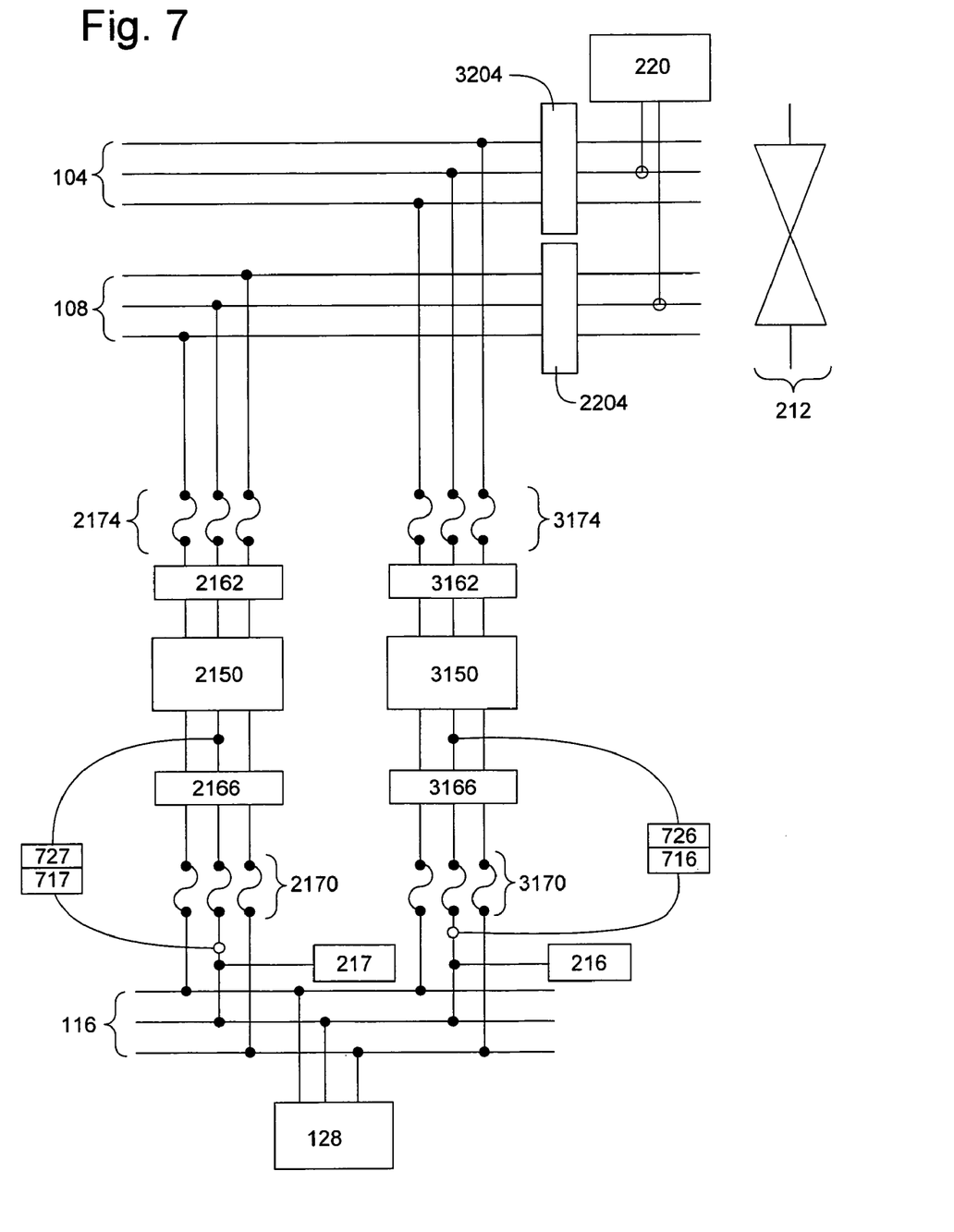
FIG. 7 illustrates the use of a repeater to pick up and retransmit data records around an open network protector.

FIG. 7 illustrates an alternative to a data bridge as shown in FIGS. 4 and 5. In FIG. 7, the data records transmitted by transmitters 216 and 217 in their respective time slots are received by repeater receiver 716 and then retransmitted in the appropriate time slots by repeater transmitter 726. The timeslot to be used could be discerned based on the identity of the original transmitter as discerned from the data record, from a time slot indication provided in the data record, or by noting the time of receipt of the data record.

To illustrate this point, transmitter 217 transmits a data record1A in time slot 1. This data record is obtained from the bus by a pick-up coil or alternative means and processed by repeater receiver 716. Transmitter 216 transmits a data record3A in time slot 3. This data record is read by repeater receiver 716. During the next time slot 1, transmitter 217 transmits a data record1B in time slot 1 while repeater transmitter 726 could retransmit data record1A. As this would be two transmitters transmitting during the same time slot, some data could be lost as the data records may not be identical between data record1A and data record1B. In order to avoid this potential for loss, the repeater transmitter 726 does not transmit any data records unless the most recent data record from transmitter 216 indicates that network protector 3166 is open. (Alternatively, the repeater transmitter 726 could receive status information directly from network protector 3166.) Thus, repeater transmitter 726 does not retransmit data records from either transmitter 216 or any other transmitter (such as 217) unless there is a known need to bridge around open network protector 3166. Repeater receiver 716 and repeater transmitter 726 could be two separate components or different functionalities of one device.

In a like manner, repeater receiver 717 and repeater transmitter 727 operate to selectively retransmit data records obtained and processed at repeater receiver 717. The data records are injected above network protector 2166 if the network protector 2166 is open (as indicated by the data record from transmitter 217 or data received from network protector 2166). FIG. 7 shows the repeater receivers acquiring the data record from the local distribution side of fuses 2170 and 3170. The repeater receivers could also be connected to acquire the data record between the fuses 2170 and 3170 and the network protectors 2166 and 3166.

Figure 8:
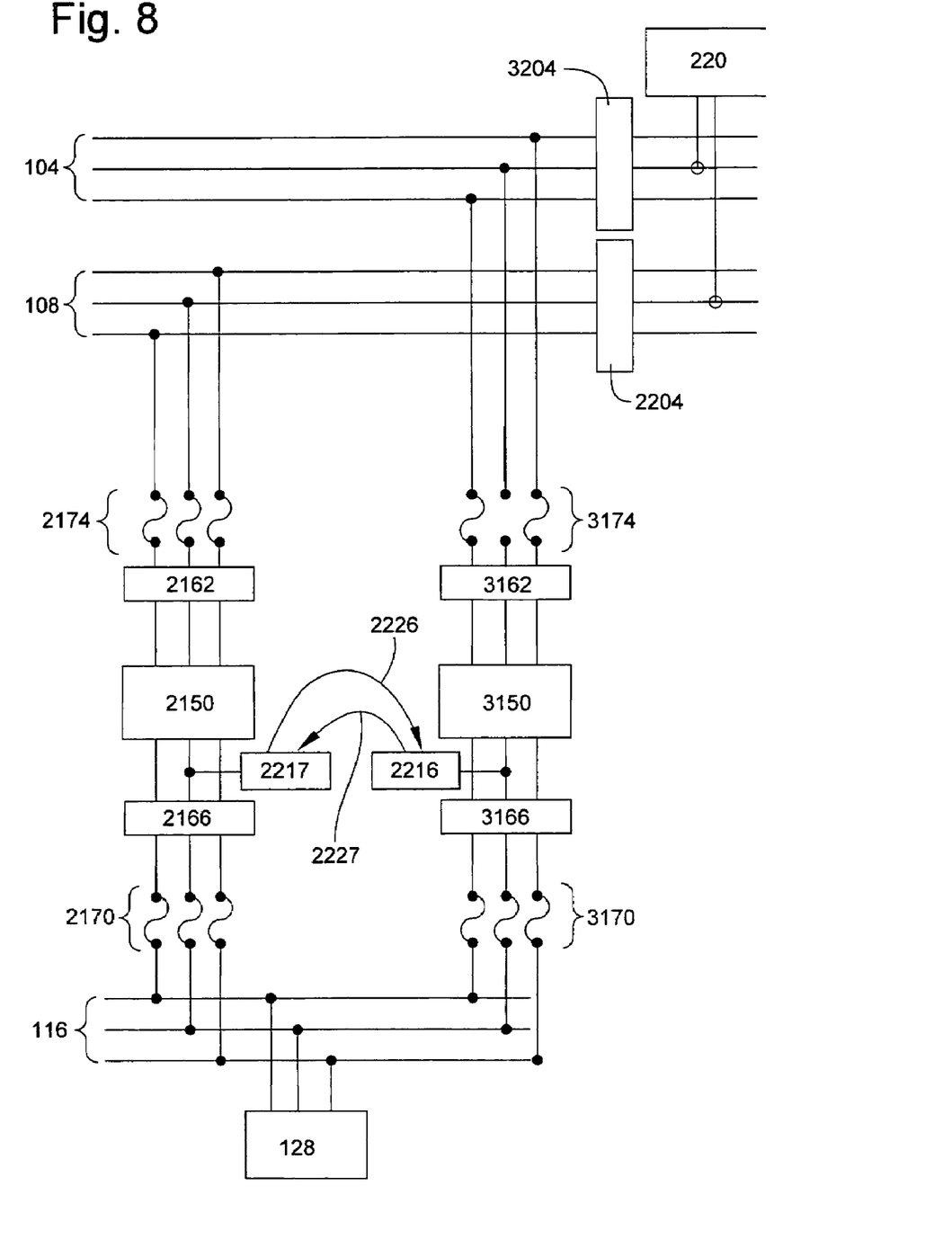
FIG. 8 illustrates the use of an alternative data path to allow a data record to be passed directly from a first transmitter to a second transmitter and to be transmitted by that second transmitter.

FIG. 8 illustrates another strategy for providing for an alternative communication path from a transmitter to the receiver in the substation. In FIG. 8, the transmitters 2216 and 2217 are located between the secondary of the transformers 2150 and 3150 and the network protectors 2166 and 3166. In the event that a fuse on the B phase of the set of primary fuses 3174 opens, the primary communication path between transmitter 2216 and receiver 220 is interrupted. The secondary communication path from transmitter 2216 and receiver 220 is through network protector 3166. If the secondary communication path is blocked as network protector 3166 is open, then the transmitter 2216 knowing that the network protector 3166 is open can opt to use an alternative path.

The alternative path for sending a data record from transmitter 2216 shown in FIG. 6 is to send the data record over a communication link 2227 to an input data port on transmitter 2217. This data record contains an identification of the transmitter that created the data record. Transmitter 2217 would transmit its own data record in the allocated time slot for transmitter 2217 and transmit the data record received from transmitter 2216 during the time slot for transmitter 2216. Transmitter 2217 would know the time slot for transmitter 2216 through receipt of this information from transmitter 2216 such as within the data record sent by transmitter 2216 or through a previously stored set of information that included the mapping of transmission time slots to specific transmitters for at least those transmitters with a data link connected directly to transmitter 2217.

In order to provide for an alternative data communication path for transmitter 2217, the data record created by transformer 2217 could be passed over data link 2226 to a data port on transmitter 2216 and subsequently transmitted by transmitter 2216 using the time slot for transformer 2217. Transmitter 2217 would send data records across data link 2226 to transmitter 2216 whenever transmitter 2217 noted that network protector 2166 was open. Thus, the alternative path can be used when the secondary data path is blocked. The alternative path can be used whether or not the primary data path is viable (through transformer 2150 and ultimately through feeder bus 108).

If primary fuse 3174 is restored but network protector 3166 remains open, then two paths exist for the transmission of a data record from transmitter 2216. During the time slot allocated to transmitter 2216 the data record would travel on the primary data path through transformer 3150 and to receiver 220 through feeder bus 104. A second copy of the data record from transmitter 2216 would be sent via data link 2227 to transmitter 2217 and then sent by transmitter 2217 on the next instance of the time slot reserved for transmitter 2216 through transformer 2150 and ultimately feeder bus 108. Note that as transmitter 2217 is sending the data record received from transmitter 2216, transmitter 2216 is sending a new data record through the primary data path to receiver 220 on feeder bus 104. Thus, receiver 220 will receive two data records transmitted from transmitter 2216 on subsequent transmission cycles at approximately the same time over feeder bus 104 and feeder bus 108.

The handling of this situation turns on how the receiver processes the data records. If the data record has a transmission time stamp from transmitter 2216, then the duplicate data record received belatedly on feeder bus 108 can be deleted by receiver 220 as redundant. If the receiver 220 simply stores the most recent data record from each transmitter, then the belated data record from transmitter 2216 received via alternative data path on feeder bus 108 could conceivably replace the newer data record recently received over the primary data path on feeder bus 104 (if the newer data record was processed before the belated data record). Due to relative stability of the data sent via the data records in comparison with the frequency of transmission of the data records, this is not a serious problem.

FIG. 8 uses two links 2226 and 2227 to facilitate the discussion of the explanation of the concept. One of skill in the art will recognize that while two separate communication links could be used, one data link could be used for communication in both directions if the transmitters use bidirectional ports.

The present invention is incorporated in FIG. 8 does not require that the two transmitters rely on each other to be the alternative data paths. For example for transmitters A, B, and C, transmitter A could have a data path to transmitter B which has a data path to transformer C which has a data path to transmitter A. Thus, each transmitter is connected to one other transmitter.

Alternatively, a transmitter such as transmitter 2216 could be connected to more than one transmitter to create two alternative data paths when network protector 3166 prevents use of the secondary data path. Duplicative data records received by the receiver 220 over different feeder buses can be processed as discussed above.

One or skill in the art will recognize that the alternative embodiments set forth above are not mutually exclusive and that in some cases alternative embodiments can be created that implement two or more of the variations set forth above.

Those skilled in the art will recognize that the methods and apparatus of the present invention have many applications and that the present invention is not limited to the specific examples given to promote understanding of the present invention. Moreover, the scope of the present invention covers the range of variations, modifications, and substitutions for the system components described herein, as would be known to those of skill in the art.

The legal limitations of the scope of the claimed invention are set forth in the claims that follow and extend to cover their legal equivalents. Those unfamiliar with the legal tests for equivalency should consult a person registered to practice before the patent authority that granted this patent such as the United States Patent and Trademark Office or its counterpart.

What is claimed is:

1. A method of conveying a first data record comprising information about a first transformer, the first transformer having a primary side adapted to receive power from a first feeder bus at a first voltage and a secondary side adapted to output power at a second voltage that is lower than the first voltage, the first data record moving from a first transmitter on the secondary side of the first transformer to a receiver in data communication with the first feeder bus, the method comprising:
   creating the first data record for output from the first transmitter, the first data record comprising information about the operation of the first transformer;
   transmitting the first data record onto a portion of an electrical distribution network using a power line carrier frequency;
   receiving at the receiver the first data record from the first transmitter comprising information about the first transformer through a second feeder bus that does not provide power to the primary side of the first transformer;
   decoding the first data record to identify that the data record was transmitted from the first transmitter and comprises information about the operation of the first transformer and;
   wherein the step of transmitting the first data record onto the portion of the electrical distribution network using the power line carrier frequency comprises transmitting the first data record onto the electrical distribution network between a first network protector on the secondary side of the first transformer and a local distribution network connected to the secondary side of the first transformer such that a data communication path between the first transmitter and the second feeder bus does not include the first network protector.

2. The method of claim 1 wherein the first data record travels from the first transmitter to the receiver through a path comprising:
   at least a portion of a local distribution network,
   movement across a second transformer from a secondary side of a second transformer through the second transformer to a primary side of the second transformer, and
   a least a portion of the second feeder bus.

3. The method of claim 1 wherein the receiver also receives the first data record from the first transmitter via a communication path that includes the first feeder bus.

4. The method of claim 3 wherein the receiver recognizes that the first data record received on the second feeder bus is redundant to the first data record received on the first feeder bus as the first data record indicates an original source transmitter and an original transmission time for the first data record.

5. The method of claim 1 wherein the step of transmitting the first data record onto the portion of the electrical distribution network using the power line carrier frequency comprises transmitting the first data record onto the electrical distribution network between a secondary fuse on the secondary side of the first transformer and the local distribution network connected to the secondary side of the first transformer such that the data communication path between the first transmitter and the second feeder bus does not include the first network protector and does not include the secondary fuse.

6. A method of conveying a first data record comprising information about a first transformer, the first transformer having a primary side adapted to receive power at a first frequency from a first feeder bus at a first voltage and a secondary side adapted to output power at a second voltage that is lower than the first voltage, the first data record moving from a first transmitter on the secondary side of the first transformer to a receiver in data communication with the first feeder bus and a second feeder bus, the method comprising:
   creating the first data record for output from the transmitter, the first data record comprising information about the operation of the first transformer;
   transmitting using a power line carrier frequency the first data record onto a portion of an electrical distribution network between a first network protector on the secondary side of the first transformer and a local distribution network connected to the secondary side of the first transformer such that a data communication path between the first transmitter and the second feeder bus does not include the first network protector;
   passing the first data record around an electrical component that is not currently allowing for the passage of the power line carrier frequency from the first transmitter to the receiver;
   receiving the first data record from the first transmitter comprising information about the first transformer through a communication path that excludes the first transformer; and
   decoding the first data record to identify that the first data record was originally transmitted from the first transmitter.

7. The method of claim 6 wherein the passing of the first data record around the electrical component not currently allowing for the passage of the power line carrier frequency comprises providing a pathway around the electrical component that provides a low impedance pathway for frequencies that includes the power line carrier frequency and provides a high impedance pathway for the first frequency.

8. The method of claim 6 wherein the step of passing the first data record around the electrical component that is not currently allowing for the passage of the power line carrier frequency from the first transmitter to the receiver comprises passing the first data record around at least two electrical components that are not currently allowing for the passage of the power line carrier frequency from the first transmitter to the receiver.

9. The method of claim 6 wherein the step of passing the first data record around the electrical component that is not currently allowing for the passage of the power line carrier frequency from the first transmitter to the receiver comprises:
   obtaining the first data record from the secondary side of the first transformer on a first side of the electrical component that is not currently allowing for the passage of the carrier frequency;
   processing the first data record in a repeater receiver; and
   transmitting the first data record after processing in the repeater receiver onto the other side of the electrical component that is not currently allowing for the passage of the carrier frequency.

10. The method of claim 9 wherein electrical component not allowing for the passage of the power line carrier frequency is a first network protector connected between the secondary side of the first transformer and a local distribution network and the step of transmitting the first data record after processing in the repeater receiver includes the step of determining that the first network protector is open else the first data record is not transmitted onto the other side of the first network protector after processing the first data record in the repeater receiver.

11. A method of conveying a first data record comprising information about a first transformer, the first transformer having a primary side adapted to receive power from a first feeder bus at a first voltage and a secondary side adapted to output power at a second voltage that is lower than the first voltage, the first data record moving from a first transmitter on the secondary side of the first transformer to a receiver in data communication with the first feeder bus, the method comprising:

creating the first data record for output from the first transmitter, the first data record comprising information about the operation of the first transformer;

conveying the first data record from the first transmitter to an input port on a second transmitter, the second transmitter associated with a second transformer having a primary side adapted to receive power from a second feeder bus at the first voltage and a secondary side adapted to output power at the second voltage that is lower than the first voltage, the second transmitter connected to the secondary side of the second transformer;

transmitting the first data record from the second transmitter to the secondary side of the second transformer between the secondary of the second transformer and a second network protector connected between the secondary side of the second transformer and a local distribution network, the transmission of the first data record by the second transmitter allowing the first data record to pass through the second transformer to reach the second feeder bus without traveling through the second network protector;

receiving the first data record comprising information about the first transformer through the second feeder bus that does not provide power to the primary side of the first transformer; and decoding the first data record to identify that the data record was originally conveyed from the first transmitter.

12. The method of claim 11 wherein the transmitting of the first data record from the second transmitter does not occur when a first network protector is closed, the first network protector connected between the secondary side of the first transformer and the local distribution network.

13. The method of claim 12 wherein the conveying of the first data record from the first transmitter to the input port on the second transmitter does not occur when the first network protector is closed.

14. The method of claim 12 wherein the conveying of the first data record from the first transmitter to the input port on the second transmitter occurs independently of whether the first network protector is closed but the second transmitter does not transmit the first data record when the first data record indicates that the first network protector is closed.

* * * * *